Aug. 25, 1925.
F. A. RAY
1,551,329
TANK FOR SEPARATING GAS AND WATER FROM OIL
Filed May 16, 1925
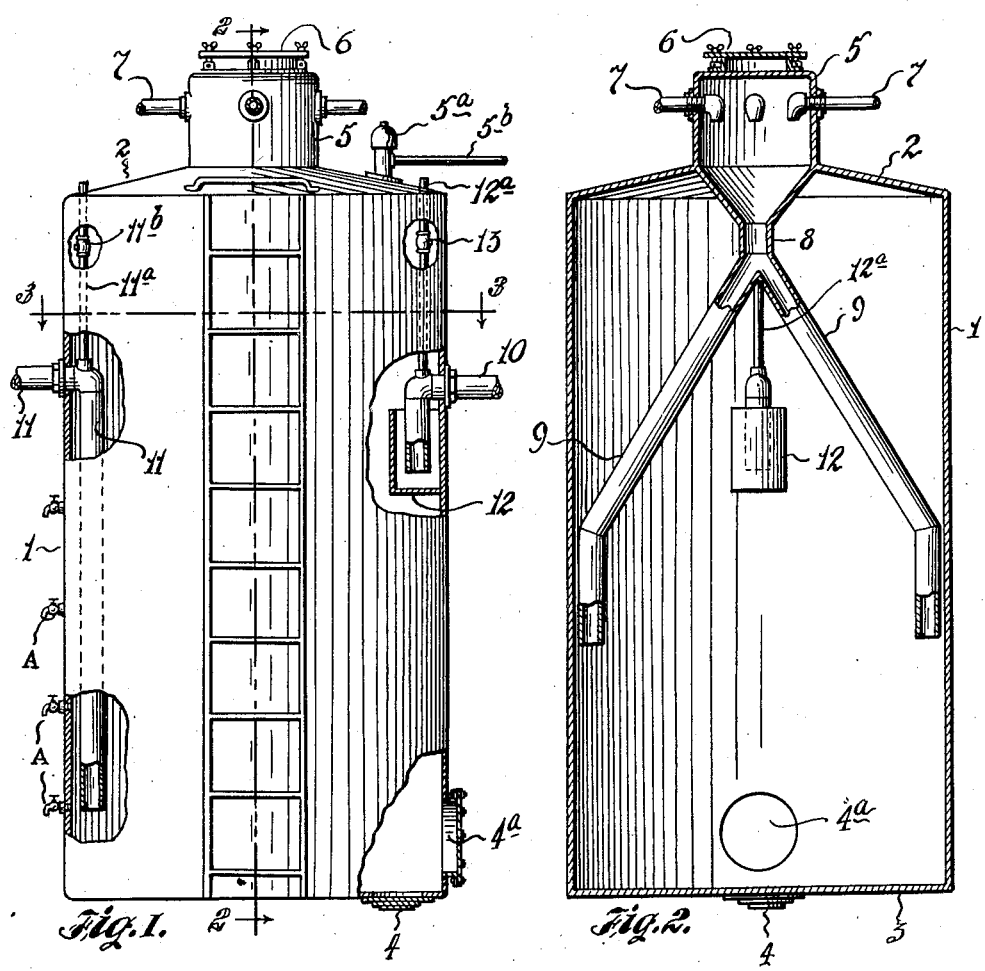
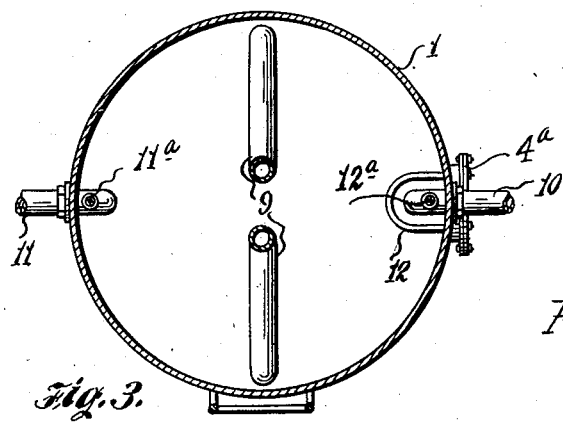
F. A. Ray,
INVENTOR
BY
ATTORNEY Patented Aug. 25, 1925.

1,551,329

UNITED STATES PATENT OFFICE.

FELBERT A. RAY, OF WICHITA FALLS, TEXAS.

TANK FOR SEPARATING GAS AND WATER FROM OIL.

Application filed May 16, 1925. Serial No. 30,732.

*To all whom it may concern:*

Be it known that I, FELBERT A. RAY, a citizen of the United States, residing at Wichita Falls, in the county of Wichita and State of Texas, have invented certain new and useful Improvements in Tanks for Separating Gas and Water from Oil, of which the following is a specification.

This invention relates to improvements in tanks such as are used in oil fields and has for its primary object the provision of a tank for separating water and gas from the oil and trapping the gas and directing it to a storage tank or engine.

The invention also provides a tank of this nature which will prevent the escape of the gas except through the proper outlet and will permit the water to be drawn off automatically, and separated from the oil and also enable the oil to be drawn off and directed to a storage tank.

With the above and other important objects in view the invention will be better and more clearly understood by reference to the following description, taken in connection with the accompanying drawing forming part hereof and in which:

Figure 1 is an elevational view of a tank embodying the invention with parts broken away to show the interior arrangement.

Figure 2 is a vertical sectional view on the line 2—2 of Figure 1, and

Figure 3 is a cross-sectional view on the line 3—3 of Figure 1.

In the following detailed description, numerals are employed to designate the various parts of the tank, and wherein 1 denotes the walls, 2 the top and 3 the bottom thereof. The bottom has the usual plug 4 for draining the settlings of the tank and a clean-out 4ª.

In the top 2 of the tank is a housing 5 with a "thief-hole" cover 6 and a pop-off valve 5ª. It will be noticed that the housing encloses the delivery ends of several pipes 7—7 leading from a well and as many pipes as is practicable may be enclosed in this housing. It will also be seen that the housing at the bottom is conical and has connected to its neck 8 a pair of downwardly and obliquely directed pipes 9—9. The minimum of disturbance and agitation is desirable in delivering the oil into the tank, therefore the housing is provided with the cone-shaped bottom and the tank provided with the laterally and obliquely-disposed pipes 9—9 which permits the oil to flow into the tank with less agitation than otherwise and prevents in a large measure the oil being broken and the gas liberated therefrom.

The tank is also provided with an oil outlet pipe 10 and a water outlet pipe 11. The oil outlet pipe 10 it will be noticed in Figure 1 extends downward and has a box 12 surrounding its lower end and extending upward nearly to its elbow. This is for the purpose of preventing the gas from escaping when the body of oil in the tank is below the box, since the gas will rise to the top of the tank and the pressure of gas will not be sufficient to unseal the opening in the oil pipe 10. This pipe 10 is connected up to a storage tank.

The tank is also provided with a pipe 12ª with a valve 13 and connected to the oil pipe 10 for the purpose of preventing siphoning. The pipe 11 has also a vacuum release pipe and valve 11ª and 11ᵇ.

In the operation of the tank, the fluid enters the housing 5 through the inlets 7—7 and thence passes into the tank through the pipes 9—9. When the liquid reaches the level of the oil outlet 10 the oil will flow into the storage tank, passing through the box 12. The box will then contain sufficient oil to prevent escape of the gas when the oil gets below the level of the box or pipe 10. Since the oil is lighter than the water it is not heavy enough to force the water, below the oil, up through the pipe 11, but this is effected by means of gas pressure accumulating in the top of the tank and will, with the weight of the oil, force the water through pipe 11 and outward from the tank. The pop-off valve 5ª will release the gas when the pressure accumulates beyond a predetermined pressure. The normal pressure in the tank will be sufficient to force the water outward. By the above arrangement the oil, gas and water will be separated and the oil and gas directed away. It will be noticed that means are provided by connection of pipe 5ᵇ to the pop-off valve pipe to conduct the gas to an engine. It will also be understood that the outlet pipe 10 is sufficiently large to enable the oil to be drained and the oil cannot pass higher than the box 12.

The water outlet pipe 11 extends downwardly into the tank to near the bottom and adjacent this pipe are a number of faucets A—A. These are for the purpose of ascertaining the level of the liquid whether oil or water and also for inspecting the grade of oil in the tank.

It is to be understood that the invention is not limited to the particular construction here illustrated but may be modified to an extent within the scope and meaning of the following claims:

1. A tank of the character described for separating gas and water from oil, comprising, in combination, a housing in the top of the tank and extending downward into the tank, inlets extending into the housing tubular members extending downward from said housing into said tank, an outlet in the tank for draining off oil, means for draining off water from the tank, means for ascertaining the liquid level in the tank and inspecting the contents, and means for preventing gas from escaping through said oil outlet when the liquid is below the oil outlet.

2. In a tank as described in claim 1, said oil outlet comprising a relatively short pipe located intermediate the top and bottom of the tank and surrounded by a box to contain liquid, the oil outlet being normally immersed in said liquid to prevent gas from escaping through the oil outlet.

3. A tank as described in claim 1, said oil outlet pipe and said water outlet pipe having a vacuum release means and said means for ascertaining the liquid level comprising a plurality of spaced openings in the tank with valve control means.

In testimony whereof I have signed my name to this specification.

FELBERT A. RAY.